United States Patent [19]

Allen

[11] 4,362,288

[45] Dec. 7, 1982

[54] SHOCK-ABSORBING CABLE ANCHOR FOR MOBILE EQUIPMENT

[76] Inventor: Herman Allen, Rte. 3, Box A-16, Orgas, W. Va. 25148

[21] Appl. No.: 163,578

[22] Filed: Jun. 27, 1980

[51] Int. Cl.³ .......................................... F16M 13/00
[52] U.S. Cl. ..................................... 248/613; 248/51; 24/115 L; 24/115 M
[58] Field of Search .................... 248/51, 52, 610, 611, 248/612, 613; 403/211; 24/115 L, 115 M

[56] References Cited

U.S. PATENT DOCUMENTS

| 424,388 | 3/1890 | Weigel ............................... 403/211 |
| 1,653,840 | 12/1927 | Byl . |
| 1,859,561 | 5/1932 | Haworth ............................ 403/211 |
| 3,136,435 | 6/1964 | Vickers . |
| 3,905,711 | 9/1975 | Rogers . |
| 4,071,124 | 1/1978 | Price . |

FOREIGN PATENT DOCUMENTS

| 596257 | 10/1925 | France ................................ 403/211 |
| 1077451 | 11/1954 | France ................................ 248/51 |
| 101382 | 9/1923 | Switzerland ......................... 248/51 |
| 515024 | 11/1939 | United Kingdom ................. 248/51 |

*Primary Examiner*—William H. Schultz
*Attorney, Agent, or Firm*—Oblon, Fisher, Spivak, McClelland & Maier

[57] ABSTRACT

A shock absorbing cable anchor for mobile equipment has an open-ended sleeve or housing with a slot along one side thereof through which an electrical cable may be inserted, with both ends of the cable passing through one of the open ends of the sleeve and the cable defining a loop or bight portion projecting out of the other open end of the sleeve. The sleeve is tapered from said one end to the other open end and is larger in width at said other open end. A wedge shaped complementally to the sleeve is inserted through said other open end of the sleeve and presses the cable outwardly against the sleeve sides to prevent the cable from being pulled out of the sleeve. A spring device is connected between the sleeve and an anchor point to resiliently support the sleeve and cable.

1 Claim, 5 Drawing Figures

SHOCK-ABSORBING CABLE ANCHOR FOR MOBILE EQUIPMENT

BACKGROUND OF THE INVENTION

1. Field of the Invention

This invention relates generally to anchors or supports for electrical cables connected between a power source and mobile equipment, and more particularly, relates to such an anchor for underground use. These anchors or cable supports are intended to suspend or hold an electrical cable out of the way of such mobile equipment while at the same time enabling the equipment to be moved from place to place.

2. Description of the Prior Art

Many different types of apparatus have been used in the prior art for supporting electrical cables to mobile equipment, including spring loaded devices, wheeled tracks, and even lighter than air balloons.

Since the electrical cables are connected with moveable equipment, it is important that means be provided for absorbing shocks as the equipment is moved from place to place. Devices for absorbing shock loads have ranged from the lighter than air balloon mentioned previously to old rubber tires secured to an anchor point and having the electrical cables tied thereto. Other devices have merely anchored the cable to an anchor point without any resilient connection whatsoever and accordingly, when a shock load does occur on the cable, the cable usually breaks.

The prior art devices with which applicant is familiar comprise several different devices, including those which have a resilient connection to an anchor point and those which do not. In all such devices, however, the cable is either subjected to large stresses because of knots tied therein or because of short support points and/or excessive time and effort is required in order to assemble and disassemble the cable support connection. Examples of prior art devices of which applicant is aware are exemplified by U.S. Pat. Nos. 1,653,840; 3,136,435; 3,905,711; and 4,071,124.

SUMMARY OF THE INVENTION

Therefore, it is an object of the present invention to provide a cable support or anchor for supporting an electrical cable connected with mobile equipment in such a manner that the cable is resiliently connected to an anchor point for absorbing shock loads on the cable and the cable support or anchor is easily assembled and disassembled.

Another object of the invention is to provide a cable support or anchor which does not require separate fasteners such as bolts or screws and the like and which engages the cable over a large area thus producing very little stress in the cable.

A still further object of the present invention is to provide a cable anchor or support for underground mobile equipment wherein the cable anchor is connected to a roof bolt in an underground tunnel and the cable support or anchor may be readily moved from one location to another.

Yet another object of the invention is to provide a simple and economical cable support or anchor for electrical cables connected with underground mobile equipment, wherein the cable support or anchor may be assembled and disassembled and moved from one location to another without requiring the use of special tools or the like and the cable may be assembled to and removed from the support without requiring loosening of either end of the cable from the power source or underground mobile equipment.

Another object of the invention is to provide a cable support or anchor which is simple and economical in construction and which does not require the use of separate fasteners or tools.

BRIEF DESCRIPTION OF THE DRAWINGS

Various other objects, features and attendant advantages of the present invention will be more fully appreciated as the same becomes better understood from the following detailed description when considered in connection with the accompanying drawings, and wherein.

DETAILED DESCRIPTION OF THE PREFERRED EMBODIMENT

Figure 1:
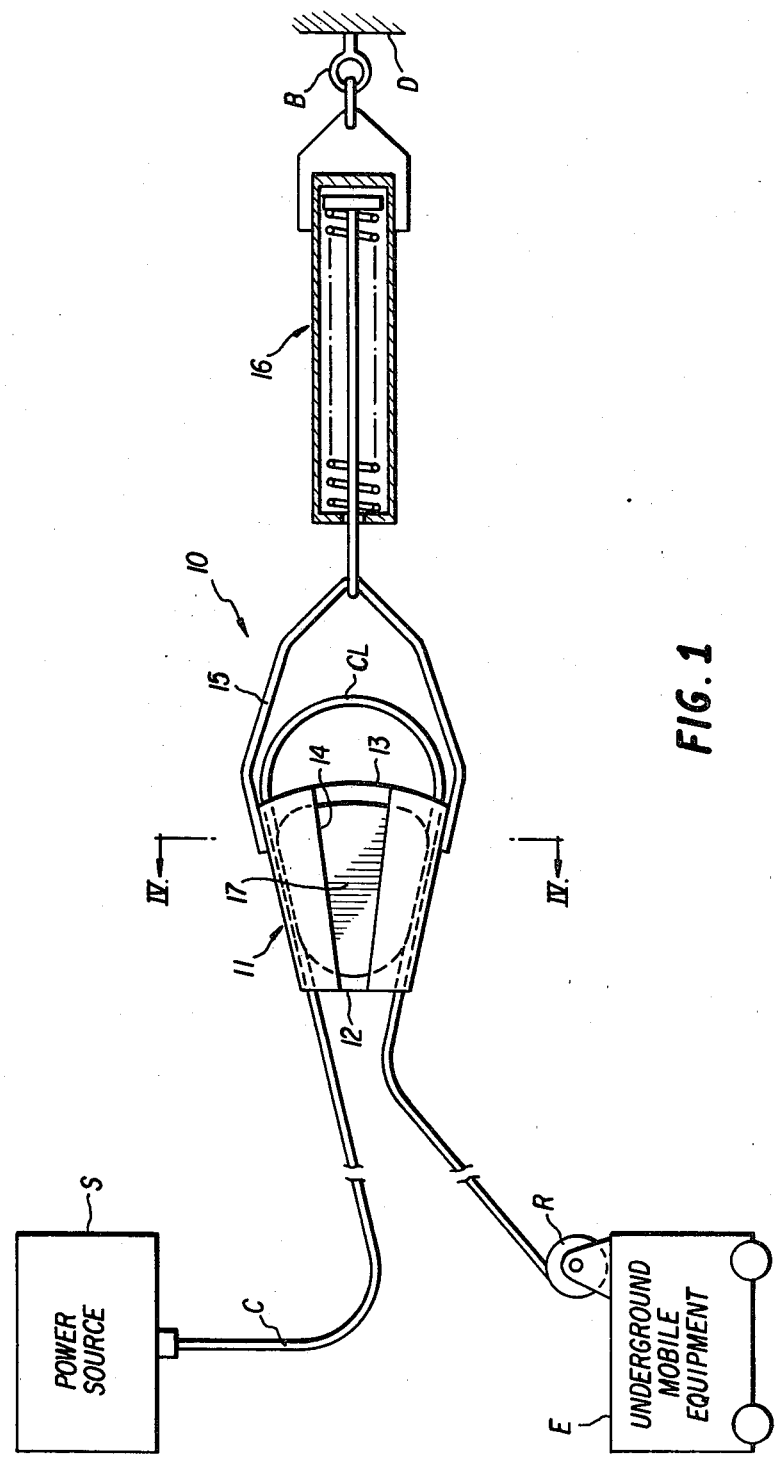
FIG. 1 is a diagrammatic view showing the major elements of the invention with the cable anchor or support being greatly enlarged relative to the power source and mobile equipment.

In the drawings, wherein like reference numerals indicate like parts throughout the several views, a cable anchor or support is indicated generally as 10 and comprises a sleeve or housing 11 having first and second open ends 12 and 13, respectively, and a slot 14 extending along one side thereof. The sleeve or housing 11 is tapered from the first to the second end and is larger in width at the second end.

A stirrup or connecting bracket 15 is secured at its opposite ends as by welding or the like to opposite outer surface portions of the second end of the sleeve 11. A resilient connecting means such as spring 16 is connected at one end with the stirrup 15 and at its other end to a roof bolt B or the like secured to an anchor point P.

An electrical cable C is connected at one end with a power source S and at its other end with a take-up reel R on underground mobile equipment E. Between its ends the cable is formed with a loop CL and the loop is inserted in the sleeve 11 through the slot 14 in one side thereof and a wedge 17 is then inserted through the second open end 13 of the sleeve 11 and completely received therein into contacting engagement with the cable C to tightly wedge the cable C against the opposite inner side edge surfaces of the sleeve 11.

Figure 3:
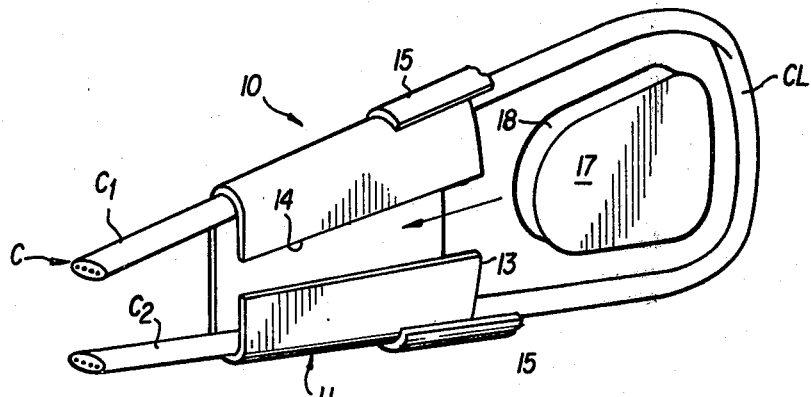
FIG. 3 is an exploded perspective view showing the sleeve and wedge of the cable anchor or support of the invention showing the manner in which the wedge is inserted into the sleeve to secure the cable thereto.
Figure 5:
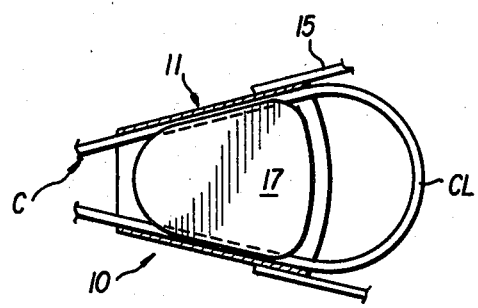
FIG. 5 is a view in section taken along line V—V in FIG. 4.
Figure 4:
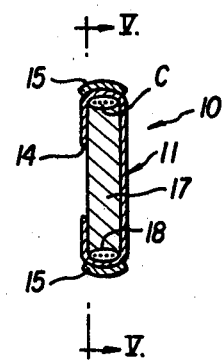
FIG. 4 is a view in section taken along line IV—IV in FIG. 1.

As seen best in FIGS. 3 and 4, the wedge 17 has a peripheral groove 18 therein in which the cable is received when the wedge is assembled to the housing 11.

The sleeve or housing 11 may be made of any suitable material having adequate strength and rigidity and one preferred material is sheet metal having a thickness of approximately ⅜". The wedge likewise may be made of any suitable material such as wood, metal, plastic, and the like and the spring 16 preferably has a capacity of about 240 lbs.

Figure 2:
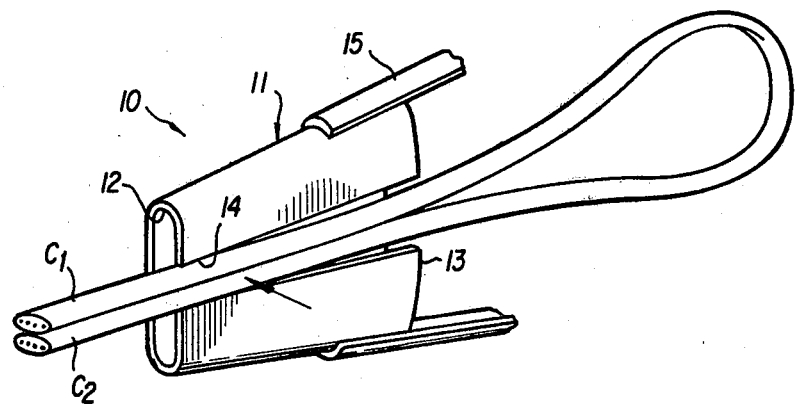
FIG. 2 is a fragmentary perspective view of the cable support sleeve, showing the manner in which a cable is inserted thereinto.

In use, the cable C is formed with a loop CL as noted previously and as seen in FIG. 2 the opposite lays or flights C1 and C2 of the cable C are placed in contiguous relationship with one another and inserted sideways through the slot 14 in the side of the sleeve 11. Thereafter, as seen in FIG. 3, the wedge 17 is inserted end-wise into the large open end 13 of the sleeve 11 until it comes into abutting contact with the lays C1 and C2 of the cable C and the inner confronting surfaces of the opposite side edges of the sleeve 11. With the spring 16 connected to the stirrup 15 and to a suitable anchor point P, the cable support is operable and ready to be used. When it is desired to relocate the cable anchor or support, it is necessary to merely release the spring from the anchor point P and tap the housing or sleeve 11 to dislodge the wedge 17 therefrom upon which the cable C may be urged together as seen in FIG. 2 and removed through the slotted opening 14. As can be seen, no special tools or equipment are required and the cable support or anchor is very easy to assemble and disassemble and to move from one location to another. Moreover, the cable support or anchor of the present invention contacts the cable over a span or area of nearly 10 in. and thus very little stress is imparted to the cable by the support of the present invention.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A cable anchor or support for supporting an electrical cable connected with mobile equipment, comprising:
    a sleeve having first and second open ends and a slot extending longitudinally completely across one side thereof, said sleeve being tapered from the first end to the second end and being larger in width at the second end than the first end, said sleeve comprising a sheet metal member bent to define the open ended slotted structure;
    a generally triangularly shaped wedge formed of a solid, metallic body shaped complementally to the sleeve and being insertable lengthwise into the sleeve and entirely received therein through the second open end thereof into a position between opposite flights of a cable loop inserted into the sleeve through the slot thereof for wedging opposite flights of the cable against opposite inner edge portions of the sleeve, whereby the cable is supported with a bight portion thereof projecting out of the second open end of the sleeve and the ends of the cable projecting out of the first open end of the sleeve, said wedge having a peripheral groove for contact with the cable;
    spring means connected between the second end of the sleeve and a fixed anchor point; and
    a stirrup fixed to the sleeve at the second end thereof, said spring means connected with the stirrup.

* * * * *